Jan. 20, 1953 W. J. O'BRIEN 2,626,391
RECEIVING APPARATUS FOR RADIO-FREQUENCY NAVIGATION SYSTEMS
Original Filed Aug. 27, 1945
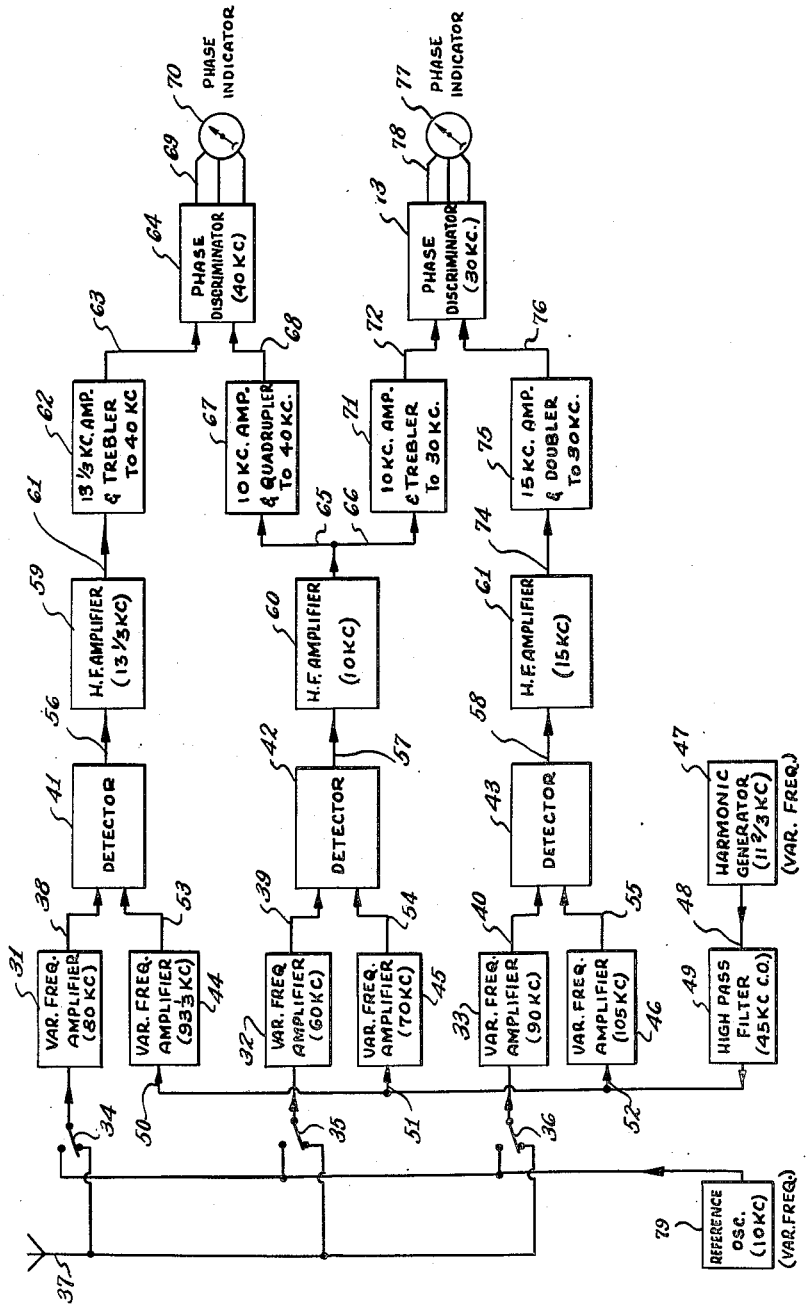
INVENTOR.
WILLIAM J. O'BRIEN
BY
Walter P. Huntley
Attorney Patented Jan. 20, 1953

2,626,391

UNITED STATES PATENT OFFICE 2,626,391

RECEIVING APPARATUS FOR RADIO-FREQUENCY NAVIGATION SYSTEMS

William J. O'Brien, London, England, assignor to The Decca Record Company, Limited, London, England, a corporation of Great Britain Original application August 27, 1945, Serial No. 612,997, now Patent No. 2,530,902, dated November 12, 1950. Divided and this application June 15, 1950, Serial No. 173,408

6 Claims. (Cl. 343—105)

My invention relates to radio frequency navigational aids for determining and indicating the geographical location of a mobile vehicle and has particular reference to a novel form of receiving apparatus for use with navigational systems of the multiple equiphase displacement type.

This application is a division of my copending application Serial No. 612,997, filed August 27, 1945, and entitled "Receiving Apparatus for Radio Frequency Navigation Systems," now Patent No. 2,530,902.

In my copending application Serial No. 107,337, filed July 28, 1949, now Patent No. 2,530,903, and entitled "Navigation System" (a continuation-in-part of an earlier application filed August 27, 1945), I have disclosed a radio frequency navigational system which operates to establish two intersecting coordinate systems defined by contours of equal phase displacement between interfering radio frequency fields of unlike but related frequencies. I have also disclosed in my Patent No. 2,500,200, issued March 14, 1950, a receiving apparatus which may be used on the mobile vehicle to receive the transmissions from the navigational equipment and provide a continuous indication of the coordinate location of the vehicle In the receiving apparatus described therein, the separately received signals are converted to a frequency equal to the least common multiple of the two frequencies the relative phase of which it is desired to determine. One possible objection to this mode of operation lies in the rather large amount of equipment required to effect the necessary frequency conversions. Also the apparatus disclosed is inherently of a fixed frequency type which, once installed, is suitable for use only on a single set of transmitting apparatus.

My first aforementioned copending application contemplates extending the coverage of the navigational system over extremely large areas by employing a plurality of individual systems of the type disclosed in that application and arranged to overlap their respective useful areas so as to extend the geographical coverage of the system. The mobile receiver in order to take advantage of the extended range and accuracy of such a system must be equipped with receiving means which will permit the proper one of the individual navigational systems to be selected out of the system network.

Because of the limitations above noted, the present invention is directed to a receiving apparatus which is simpler in construction than that which has been heretofore disclosed and which is provided with tuneable means permitting a user of the system to select any one of a group of navigational systems forming a system network.

It is therefore an object of my invention to provide a mobile receiving apparatus for use with navigational systems of the character above referred to and which operates to determine the relative phase relations at a frequency no greater than a signal frequency transmitted by the transmitting apparatus.

It is a still further object of my invention to provide an appaartus of the nature above set forth in which means is provided for tuning the receiving apparatus to allow users of the system to choose one coordinate system out of a plurality of such systems produced by the operation of the navigational system network.

It is an additional object of my invention to provide a receiving apparatus of the character set forth in the preceding paragraphs which operates on a heterodyne principle permitting the use of heterodyne frequency amplifiers which may be so constructed as to provide a high gain and excellent phase stability.

Other objects and advantages of my invention will be apparent from a study of the following specification read in connection with the single figure of the drawing comprising a block diagram illustrating a tuneable receiving apparatus which works into fixed heterodyne frequency amplifiers arranged to make a phase comparison between the received signals at frequencies lower than the lowest transmitted frequency.

Referring to the drawings, I have illustrated by diagrammatical means the apparatus employed in my invention to provide a mobile receiving apparatus suitable for use with radio frequency navigational systems of the character disclosed in my first aforementioned copending application.

The operating frequencies of the various portions of the apparatus have been indicated in the figure by frequency notations enclosed in parentheses. It will be appreciated that the frequencies specified are those corresponding to the assumed transmission frequencies of 80, 60 and 90 kilocycles and that other frequencies will be employed whenever the transmitting equipment is operated at frequencies other than those assumed.

With respect to the apparatus mentioned in the ensuing description, the amplifiers, detectors, frequency converters, phase discriminators and phase indicators may be of any suitable type.

The apparatus which is illustrated in the drawing includes variable frequency amplifiers 31, 32 and 33 the inputs of which are connected respectively through single-pole double-throw switches 34, 35 and 36 to a suitable receiving antenna 37.

The output of the amplifiers 31, 32 and 33 are respectively coupled as indicated at 38, 39 and 40 to mixing and detecting circuits 41, 42 and 43. Associated respectively with the amplifiers 31, 32 and 33 are variable frequency amplifiers 44, 45 and 46. These amplifiers are coupled to be excited from a harmonic generator 47 the output of which is coupled as indicated at 48 through a high pass filter 49 having a lower cut-off frequency of the order of magnitude of 45 kilocycles. The high frequency signals passed by the filter 49 are coupled as indicated at 50, 51 and 52 to the input circuits respectively of the amplifiers 44, 45 and 46.

The amplifiers 44, 45 and 46 are preferably of the regenerative type designed to produce an output signal as closely approaching a sinusoidal wave form as possible. If desired the amplifiers may be made regenerative to such an extent as to be self-oscillating. The outputs of these amplifiers are respectively coupled as indicated at 53, 54 and 55 to the input circuits of the detectors 41, 42 and 43 within which circuits the signals of different frequency are mixed and rectified to produce output frequencies equal to the difference between the two input frequencies.

In accordance with the assumed example the harmonic generator preferably operates at a fundamental frequency of $11\frac{2}{3}$ kilocycles with the amplifiers 44, 45 and 46 being tuned respectively to the eighth, sixth and ninth harmonics of the fundamental frequency of the harmonic generator. The amplifier 44 is, therefore, tuned to $93\frac{1}{3}$ kilocycles, the amplifier 45 is tuned to 70 kilocycles and the amplifier 46 is tuned to 105 kilocycles. As a result the output frequencies of the detectors 41, 42 and 43 are respectively $13\frac{1}{3}$ kilocycles, 10 kilocycles and 15 kilocycles.

The detectors are coupled as indicated at 56, 57 and 58 to heterodyne frequency amplifiers 59, 60 and 61 adjusted respectively to operate at fixed frequencies of $13\frac{1}{3}$, 10 and 15 kilocycles. The $13\frac{1}{3}$ kilocycle output of the heterodyne frequency amplifier 59 is coupled as indicated at 61 to an amplifier and frequency trebler 62 operating to produce a 40 kilocycle output signal which is applied as indicated at 63 to one input circuit of a phase discriminator 64. The 10 kilocycle output of the heterodyne frequency amplifier 60 is divided as indicated at 65 and 66 and one-half of the output is applied to the input of a 10 kilocycle amplifier and frequency quadrupler 67 operating to convert the 10 kilocycle input into a 40 kilocycle output, which output is applied as indicated at 68 to the other input circuit of the phase discriminator 64. The output of the phase discriminator 64 is coupled as indicated at 69 to a phase angle indicator 70 serving to indicate the relative phase relation between the two 40 kilocycle signals applied to the discriminator 64.

The other half of the 10 kilocycle output of the heterodyne frequency amplifier 60 is applied as indicated at 66 to a 10 kilocycle amplifier and frequency trebler 71 operating to convert the 10 kilocycle input into a 30 kilocycle output. This output is applied as indicated at 72 to one input circuit of a 30 kilocycle phase discriminator 73.

The 15 kilocycle output of the heterodyne frequency amplifier 61 is coupled as indicated at 74 to a 15 kilocycle amplifier and frequency doubler 75 serving to produce an output frequency of 30 kilocycles which is coupled as indicated at 76 to the other input circuit of the phase discriminator 73. The phase discriminator operates to measure the phase relation between the two 30 kilocycle input signals and to indicate by means of a phase indicator 77 coupled to the discriminator 73 as indicated at 78 the result of the determination of the phase angle between the two input signals.

It is to be noted that the result of the phase determination which is indicated on the indicators 70 and 71 is the relative phase between the two pair of navigational signals as measured on the basis of a reference frequency equal to the least common multiple of the respective transmitted frequencies. This may be explained as follows:

Assume that a phase advancement of four degrees occurs in the 80 kilocycle signal with no phase shift occurring in the 60 kilocycle signal as, for example, through movement of the mobile receiver in a circular path at a fixed distance from the 60 kilocycle transmitting antenna. The least common multiple reference frequency for the 60 and 80 kilocycle signals is 240 kilocycles or three times the 80 kilocycle signal. Therefore, the phase shift at the reference frequency of 240 kilocycles will be a phase advancement of twelve degrees or three times the actual advancement of the 80 kilocycle signal. The mixing of the 80 and $93\frac{1}{2}$ kilocycle signals in the detector circuit 41 produces an advancement of four degrees in the $13\frac{1}{3}$ kilocycle signal passed to the frequency trebler 62. The result of the frequency conversion is to advance the phase of the resulting 40 kilocycle signal three times as much as the advancement of the $13\frac{1}{3}$ kilocycle signal or a net advancement of twelve degrees. Therefore, the phase advancement of the 40 kilocycle signal applied to the phase discriminator 64 by means of the coupling 63 is twelve degrees, whereas no shift occurs in the signal coupled as indicated at 65 and 68. The indicated phase shift on the indicator 70 will accordingly be an advancement of twelve degrees.

Similarly if the phase of the 60 kilocycle signal received by the amplifier 32 advances three degrees while the phase of the 90 kilocycle signal received by the amplifier 33 remains constant the indicated phase shift at the lowest common multiple frequency of 180 kilocycles will be nine degrees. A three degree advancement of the phase of the 60 kilocycle signal results in a three degree advancement of the phase of the 10 kilocycle signal which is passed to the frequency trebler 71. The frequency trebling effected by this circuit produces a phase advancement of nine degrees in the 30 kilocycle output applied as indicated at 72 to one input of the phase discriminator 73. The phase of the signal applied to the other input of the phase discriminator 73 remains constant. The net effect is an indicated phase shift of nine degrees in the advancing direction of the 60 kilocycle signal with respect to the 90 kilocycle signal.

In accordance with the present modification of the invention the amplifiers 31—33 and 44—46 and the harmonic generator 47 are tuneable so that they may be used to select transmissions from other antennae at frequencies different from the 80, 60 and 90 kilocycle signals used in the assumed example. To simplify the tuning of the system to other transmitters, the tuning controls for the amplifiers and harmonic generator will, by preference, be ganged on a single control.

Assuming that the new transmitters desired to be received are operating on 88, 66 and 99 kilocycles respectively, the tuning control used would be advanced to tune the amplifiers 31, 32 and 33 respectively to these frequencies. At the same time the frequency of the harmonic generator 47 would be raised to 12⅔ kilocycles. The tuning change of the amplifiers 44, 45 and 46 would be to resonance with the eight, sixth and ninth harmonics of the 12⅔ kilocycle fundamental as before; in other words, to frequencies of 101⅓, 76 and 114 kilocycles. The resulting heterodyne frequencies are, therefore, unchanged, being respectively 13⅓, 10 and 15 kilocycles.

In addition to the foregoing I prefer to provide a means for periodically checking the operation of the system to detect any spurious and unwanted phase shifts which may creep into the various circuits. For this reason I employ also a reference oscillator 79 normally operating on a 10 kilocycle fundamental signal to produce an output which is rich in harmonics so that by throwing the switches 34, 35 and 36 to positions alternate to those shown, the output of the oscillator 79 may be coupled to the input circuits of the amplifiers 31, 32 and 33 so that they may amplify the eighth, sixth and ninth harmonics respectively of the reference oscillator output. The reference oscillator is preferably of a type which produces an output rich in the higher harmonics and in which the multiple phase relation between these harmonics is fixed and unchanging. During final testing and adjustment following construction, the various circuit components are preferably adjusted to give a zero reading on the two phase indicators 70 and 77 when the reference oscillator 79 is connected to the amplifier inputs. Whenever at subsequnt times the switches 34—36 are turned to the alternate positions the phase indicators 70 and 77 should read zero and any deviation from this standard reference reading constitutes an indication that some part of the apparatus requires adjustment.

The reference oscillator 79 is also made of the adjustable frequency type so that in the event the amplifier tuning is changed as described in the preceding paragraphs to other frequencies, such as 88, 66 and 99 kilocycles, the oscillator frequency may be similarly changed to 11 kilocycles to permit a check on the operation of the system to be made at the new frequency.

In the foregoing description, reference has been made to the reference oscillator 79 and the harmonic generator 47 as operating at a relatively low frequency fundamental and capable of producing an output rich in the higher harmonics. Any suitable oscillator or harmonic generator having these properties may be employed. However, I prefer to use a signal generator of the type disclosed in my copending application Serial No. 612,988, filed August 27, 1945, now Patent No. 2,524,677 and entitled "Signal Generator."

Although, as previously stated, the phase discriminators 64 and 73 and the phase indicators 70 and 77 also may be of any suitable type, a preference is expressed for the types shown respectively in my Patent No. 2,500,200 above mentioned and in my Patent No. 2,499,326 issued February 28, 1950.

Attention is directed to the fact that the tuning of the apparatus may be changed as desired to permit one group of navigational system transmitters to be selected out of a plurality of such groups which may be arranged as a chain or network of navigational systems to cover extremely large areas. It will be noted that the principal amplifying function of the receiving apparatus is done in the heterodyne frequency amplifiers, and that these amplifiers may be of the fixed frequency type permitting high gain to be realised and permitting great phase stability to be readily obtained and easily maintained.

Attention is also directed to the fact that the phase comparison is made at frequencies lower than the lowest frequency transmitted by the navigational system transmitters and that regardless of the frequency at which the phase comparison is made, the phase relation which is indicated by the phase indicators is that which corresponds to a phase measurement made at a frequency equal to the lowest common multiple of the unlike frequencies whose multiple phase relation is to be determined.

While I have shown and described the preferred embodiment of my invention I do not desire to be limited to the details of construction shown and described herein, except as defined in the appended claims.

I claim:

1. In a receiving apparatus for use with a radio frequency navigational system operating to transmit from spaced points a pair of radio frequency signals of unlike but related frequencies bearing a fixed multiple phase relation to each other, the combination of: a pair of adjustable frequency radio frequency receivers tuneable respectively to the frequencies of said signals; a pair of adjustable radio frequency amplifiers tuneable to two other frequencies of a ratio equal to the ratio of the frequencies of said signals; an adjustable frequency source of alternating electrical potential of non-sinusoidal wave form tuneable to a frequency equal to a common factor of said two other frequencies; means for applying said potential to the input circuits of said amplifiers; means for combining and rectifying the outputs of each receiver and corresponding amplifier to produce a pair of heterodyne signals of fixed frequency; a pair of frequency converters for producing from said heterodyne frequencies a pair of output signals of like frequency; and means for continuously determining and indicating the phase relation between said output signals.

2. In a receiving apparatus for use with a radio frequency navigational system operating to transmit from spaced points a pair of radio frequency signals of unlike but related frequencies bearing a fixed multiple phase relation to each other, the combination of: a pair of adjustable frequency radio frequency receivers tuneable respectively to the frequencies of said signals; a pair of adjustable radio frequency regenerative amplifiers tuneable to two other frequencies of a ratio equal to the ratio of the frequencies of said signals; an adjustable frequency source of alternating electrical potential of non-sinusoidal wave form tuneable to a frequency equal to a common factor of said two other frequencies; means for applying said potential to the input circuits of said amplifiers; means for combining and rectifying the outputs of each receiver and corresponding amplifier to produce a pair of heterodyne signals of fixed frequency; a pair of frequency converters for producing from said heterodyne frequencies a pair of output signals of like frequency; and means for continuously determining and indicating the phase relation between said output signals.

3. The method of determining the multiple phase relation between a pair of radio frequency signals of unlike but related frequencies which includes the steps of heterodyning said signals with local alternating potentials of different frequencies of a ratio equal to the ratio of the frequencies of said signals, and measuring the multiple phase relation between the resulting heterodyne frequencies by generating a pair of reference signals of known multiple phase relation and then measuring the difference between the multiple phase relations of said heterodyne frequencies resulting from said received signals and resulting from said generated signals.

4. The method of determining the multiple phase relation between a pair of radio frequency signals of unlike but related frequencies which consists in separately receiving said signals, heterodyning said signals with local alternating potentials of different frequencies of a ratio equal to the ratio of the frequencies of said signals, subjecting each of the resulting heterodyne frequencies to frequency multiplications selected to produce a pair of normal output signals of a given equal frequency, measuring the phase relation between said normal output signals by generating a pair of reference signals of different frequencies of a ratio equal to the ratio of the frequencies of said received signals and of known multiple phase relation and heterodyning said reference signals with said local alternating potentials and subjecting the resulting heterodyne frequencies to frequency multiplications selected to produce a pair of standard output signals of said given equal frequency, and then measuring the difference between the phase relations of said standard output signals and said normal output signals, and continuously indicating the result of said measurement.

5. In a receiving apparatus for use with a radio frequency navigational system operating to transmit from spaced points a pair of radio frequency signals of unlike but related frequencies bearing a fixed multiple phase relation to each other, the combination of: a pair of frequency radio frequency receivers tuned respectively to the frequencies of said signals; a pair of radio frequency amplifiers tuned to two other frequencies of a ratio equal to the ratio of the frequencies of said signals; a source of alternating electrical potential of non-sinusoidal wave form of a frequency equal to a common factor of said two other frequencies; means for applying said potential to the input circuits of said amplifiers; means for combining and rectifying the outputs of each receiver and corresponding amplifier to produce a pair of heterodyne signals; a pair of frequency converters for producing from said heterodyne frequencies a pair of output signals of like frequency; and means for continuously determining and indicating the phase relation between said output signals.

6. In an apparatus for determining the multiple phase relation between a pair of radio frequency signals of unlike but related frequencies, the combination of: a source of two alternating electrical potentials of different frequencies of a ratio equal to the ratio of the frequencies of said signals; heterodyning means connected to said source and having a pair of inputs to which said signals are applied for heterodyning said potentials with the corresponding signals to produce a pair of normal output signals; means for substituting on said inputs a pair of reference signals of known multiple phase relation for said radio frequency signals to thereby produce a pair of substitute output signals; and means connected to said heterodyning means for comparing the multiple phase relation between said normal output signals with the multiple phase relation between said substitute output signals.

WILLIAM J. O'BRIEN.

REFERENCES CITED

The following references are of record in the file of this patent:

UNITED STATES PATENTS

| Number | Name | Date |
|---|---|---|
| 1,447,204 | Espenschied | Mar. 6, 1923 |
| 1,939,434 | Busse | Dec. 12, 1933 |